(12) United States Patent
Masumoto

(10) Patent No.: US 11,950,525 B2
(45) Date of Patent: Apr. 9, 2024

(54) PROTECTIVE MEMBER AND WORK VEHICLE

(71) Applicant: KUBOTA CORPORATION, Osaka (JP)

(72) Inventor: Koji Masumoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 453 days.

(21) Appl. No.: 17/352,474

(22) Filed: Jun. 21, 2021

(65) Prior Publication Data
US 2021/0400864 A1 Dec. 30, 2021

(30) Foreign Application Priority Data

Jun. 25, 2020 (JP) .................................. 2020-109570

(51) Int. Cl.
*A01B 71/08* (2006.01)

(52) U.S. Cl.
CPC ........... *A01B 71/08* (2013.01); *Y10T 74/2191* (2015.01)

(58) Field of Classification Search
CPC ............................ A01B 71/08; Y10T 74/2191
USPC .............................. 180/271; D15/28; 16/419
See application file for complete search history.

(56) References Cited

U.S. PATENT DOCUMENTS

| 3,086,655 | A | * | 4/1963 | Compton | .................. | E03F 7/06 |
| | | | | | | 74/609 |
| 4,553,950 | A | | 11/1985 | Teich | | |
| 5,311,961 | A | | 5/1994 | Stabenow | | |
| D347,846 | S | * | 6/1994 | Derreberry | .................... | D15/28 |
| 2015/0327426 | A1 | | 11/2015 | Kato | | |

FOREIGN PATENT DOCUMENTS

| DE | 34 02 065 C1 | 4/1985 |
| JP | 55-095925 U | 7/1980 |
| JP | 2014-117244 A | 6/2014 |
| KR | 10-1417628 B1 | 7/2014 |

OTHER PUBLICATIONS

Official Communication issued in corresponding European Patent Application No. 21181492.6, dated Oct. 29, 2021.

* cited by examiner

*Primary Examiner* — Greg Binda
(74) *Attorney, Agent, or Firm* — Keating & Bennett, LLP

(57) ABSTRACT

A protective member includes an attachment portion that is attached to a tractor including a mid PTO shaft and a protective frame that is supported by the attachment portion and positioned not to overlap with the mid PTO shaft in a front view to protect the mid PTO shaft, and the protective frame is positioned not to overlap with the mid PTO shaft in a side view.

9 Claims, 5 Drawing Sheets

PROTECTIVE MEMBER AND WORK VEHICLE

CROSS REFERENCE TO RELATED APPLICATIONS

This application claims the benefit of priority to Japanese Patent Application No. 2020-109570 filed on Jun. 25, 2020. The entire contents of this application are hereby incorporated herein by reference.

BACKGROUND OF THE INVENTION

1. Field of the Invention

The disclosure relates to a protective member for protecting a mid PTO (Power Take-Off) shaft and a technique for a work vehicle.

2. Description of the Related Art

Conventionally, a technique for a work vehicle provided with a mid PTO shaft has been known. For example, the technique is as described in JP 2014-117244 A.

In a work vehicle (tractor) described in JP 2014-117244 A, a mid PTO shaft is disposed in a lower portion of a mission case and between left and right rear wheels. The mid PTO shaft can transmit power from an engine to a work device (for example, mower, etc.). At this time, a joint for power transmission is attached to the mid PTO shaft.

A protective member that protects the mid PTO shaft may be attached to the mid PTO shaft as in JP 2014-117244 A when the work device is not attached. The protective member is, for example, formed in a substantially cylindrical shape with a bottom so as to cover the mid PTO shaft, and is appropriately fixed by bolts or the like. In this configuration, it is necessary to remove the protective member when the work device is attached, which is troublesome.

SUMMARY OF THE INVENTION

Preferred embodiments of the present invention provide a protective member and a work vehicle that allow a work device to be mounted on a mid PTO shaft with the protective member attached.

That is, a protective member according to a preferred embodiment of the present invention includes an attachment portion that is attached to a work vehicle provided with a mid PTO shaft, and a protective portion that is supported by the attachment portion and does not overlap with the mid PTO shaft in a front view to protect the mid PTO shaft.

In a protective portion according to a preferred embodiment of the present invention, the protective portion does not overlap with the mid PTO shaft in a side view.

In a protective portion according to a preferred embodiment of the present invention, the protective portion does not overlap with the mid PTO shaft in a bottom view.

In a protective portion according to a preferred embodiment of the present invention, the protective portion includes a first protective portion that extends from a lower side to a front side of the mid PTO shaft in a side view.

In a protective portion according to a preferred embodiment of the present invention, the protective portion includes a pair of the first protective portions on left and right sides of the mid PTO shaft.

In a protective portion according to a preferred embodiment of the present invention, the protective portion further includes a second protective portion that connects the pair of left and right first protective portions to each other.

In a first protective portion according to a preferred embodiment of the present invention, the first protective portion includes an inclined portion extending upward toward the front of the inclined portion.

In an inclined portion according to a preferred embodiment of the present invention, the inclined portion extends from a position higher to a position lower than the mid PTO shaft.

In an attachment portion according to a preferred embodiment of the present invention, the attachment portion is attached to a PTO case provided with the mid PTO shaft.

A work vehicle according to a preferred embodiment of the present invention includes a protective member according to any of the preferred embodiments of the present invention.

Preferred embodiments of the present disclosure exhibit the following effects.

In a protective portion according to a preferred embodiment of the present invention, a work device can be mounted on the mid PTO shaft with the protective member attached.

In a protective portion according to a preferred embodiment of the present invention, the work device can be easily mounted on the mid PTO shaft with the protective member attached.

In a protective portion according to a preferred embodiment of the present invention, the work device can be easily mounted on the mid PTO shaft with the protective member attached.

In a protective portion according to a preferred embodiment of the present invention, it is possible to prevent collision with an obstacle from the front and the bottom of the mid PTO shaft.

In a protective portion according to a preferred embodiment of the present invention, the protective portion can have a simple configuration.

In a protective portion according to a preferred embodiment of the present invention, the strength of the protective portion can be improved.

In a protective portion according to a preferred embodiment of the present invention, the mid PTO shaft can be effectively prevented from colliding with an obstacle.

In a protective portion according to a preferred embodiment of the present invention, the mid PTO shaft can be more effectively prevented from colliding with an obstacle.

In a protective portion according to a preferred embodiment of the present invention, the protective member can be attached near a protection target (mid PTO shaft) and the protective member can be miniaturized.

In a work vehicle according to a preferred embodiment of the present invention, a work device can be mounted on the mid PTO shaft with the protective member attached.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENT

In the following description, the directions indicated by arrows U, D, F, B, L, and R in the figure are defined as upward, downward, forward, backward, leftward, and rightward, respectively.

Figure 1:
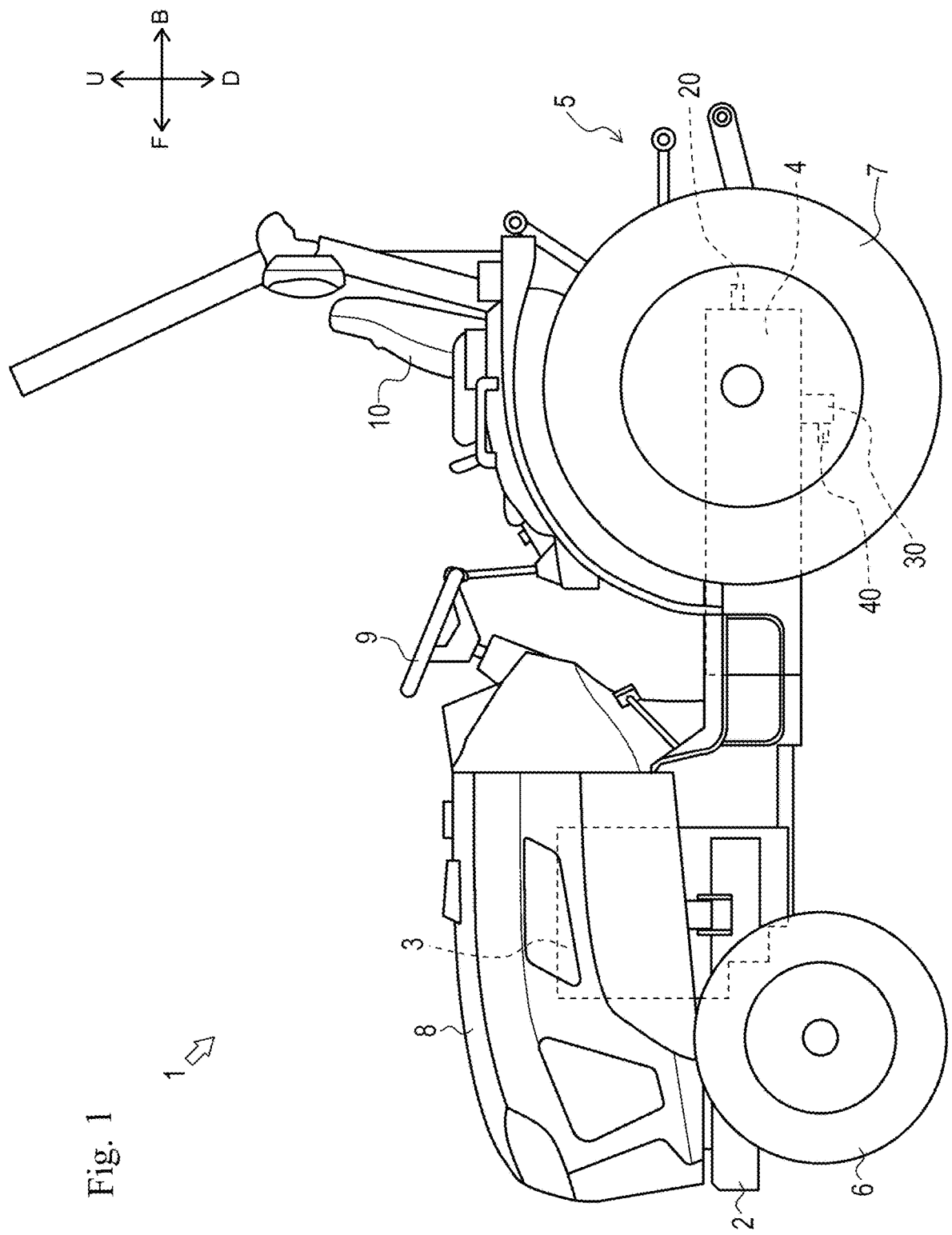
FIG. 1 is a side view showing a tractor according to a preferred embodiment of the present invention.

Hereinafter, an overall configuration of a tractor 1 according to a preferred embodiment of the present disclosure will be described with reference to FIG. 1.

The tractor 1 mainly includes a body frame 2, an engine 3, a transmission case 4, a hydraulic lifting device 5, front wheels 6, rear wheels 7, a bonnet 8, a steering wheel 9, a seat 10, and the like.

The body frame 2 is disposed with a longitudinal direction of the body frame 2 oriented in a front-rear direction. The engine 3 is fixed to a rear portion of the body frame 2. The transmission case 4 is disposed behind the engine 3. The hydraulic lifting device 5 is provided in a rear portion of the transmission case 4. Various work devices (for example, rotary tillage device, etc.) can be mounted on the hydraulic lifting device 5. Further, various work devices (for example, mowers) can be mounted on a lower portion of the transmission case 4 (between the front wheels 6 and the rear wheels 7).

Further, a front portion of the body frame 2 is supported by a pair of the left and right front wheels 6 through a front axle mechanism (not shown). The transmission case 4 is supported by a pair of the left and right rear wheels 7 through a rear axle mechanism (not shown).

The engine 3 is covered with the bonnet 8. Behind the bonnet 8, the steering wheel 9 to adjust a turning angle of the front wheels 6 is provided. Behind the steering wheel 9, the seat 10 is provided for a driver to sit on.

After a speed change by a transmission (not shown) accommodated in the transmission case 4, the power from the engine 3 can be transmitted to the front wheels 6 through the front axle mechanism, and can be transmitted to the rear wheels 7 through the rear axle mechanism. In this way, the front wheels 6 and the rear wheels 7 are rotationally driven by the power of the engine 3, and the tractor 1 can travel.

Next, configurations of the transmission case 4 and peripheral members of the transmission case 4 (rear PTO shaft 20, etc., which will be described later) will be described with reference to FIGS. 1 to 5.

Figure 2:
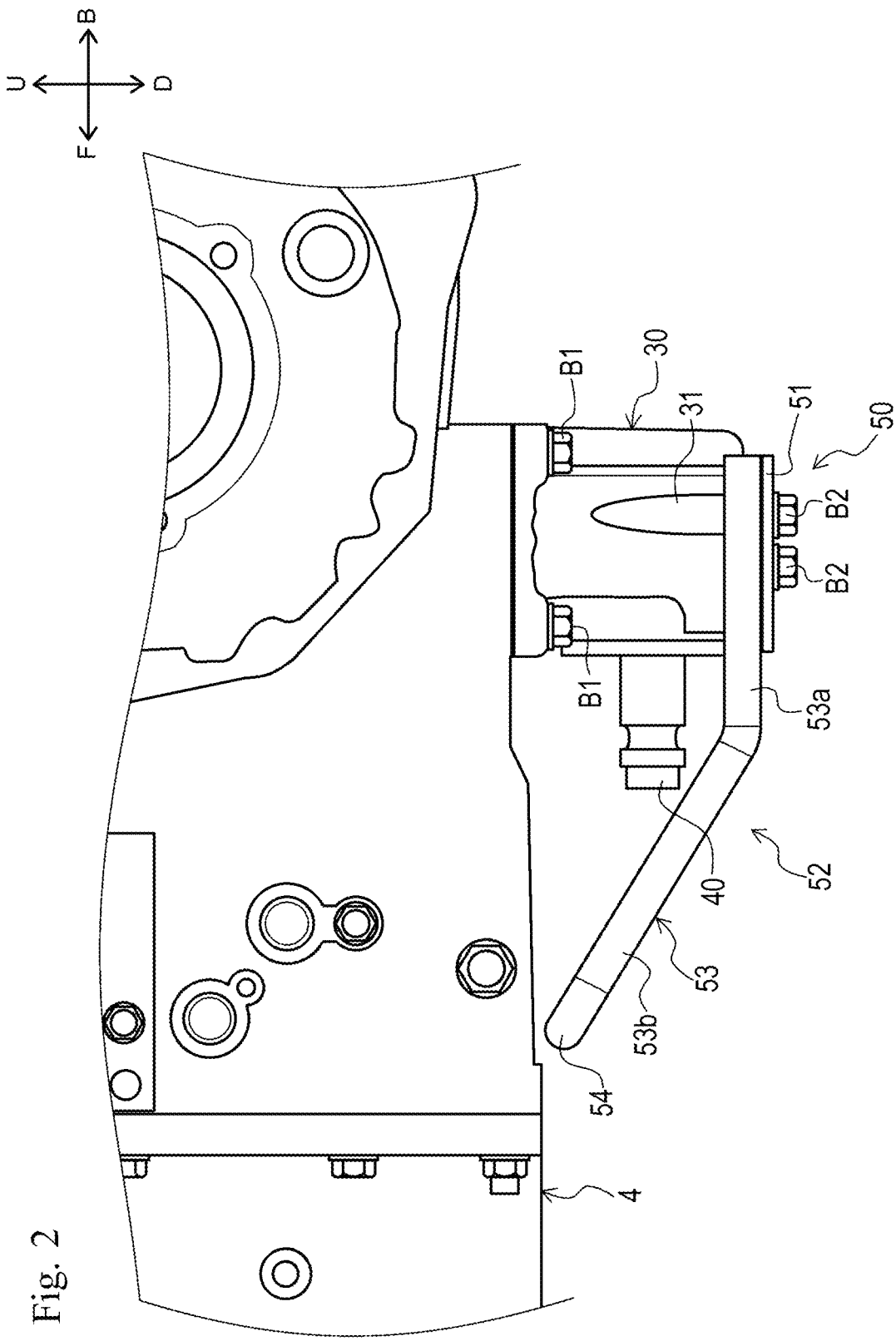
FIG. 2 is a side view showing a rear portion of a transmission case.

The transmission case 4 is to accommodate the transmission, a differential device, and the like. The transmission case 4 has a box shape or a substantially box shape that is long in the front-rear direction. As shown in FIGS. 1 and 2, the rear PTO shaft 20, a PTO case 30, a mid PTO shaft 40, a protective member 50, and the like are provided in the rear portion of the transmission case 4.

The rear PTO shaft 20 transmits power to a work device mounted on the hydraulic lifting device 5. The rear PTO shaft 20 is disposed with the axial direction oriented in the front-rear direction. The rear PTO shaft 20 is disposed so as to extend rearward from a rear end portion of the transmission case 4.

Figure 3:
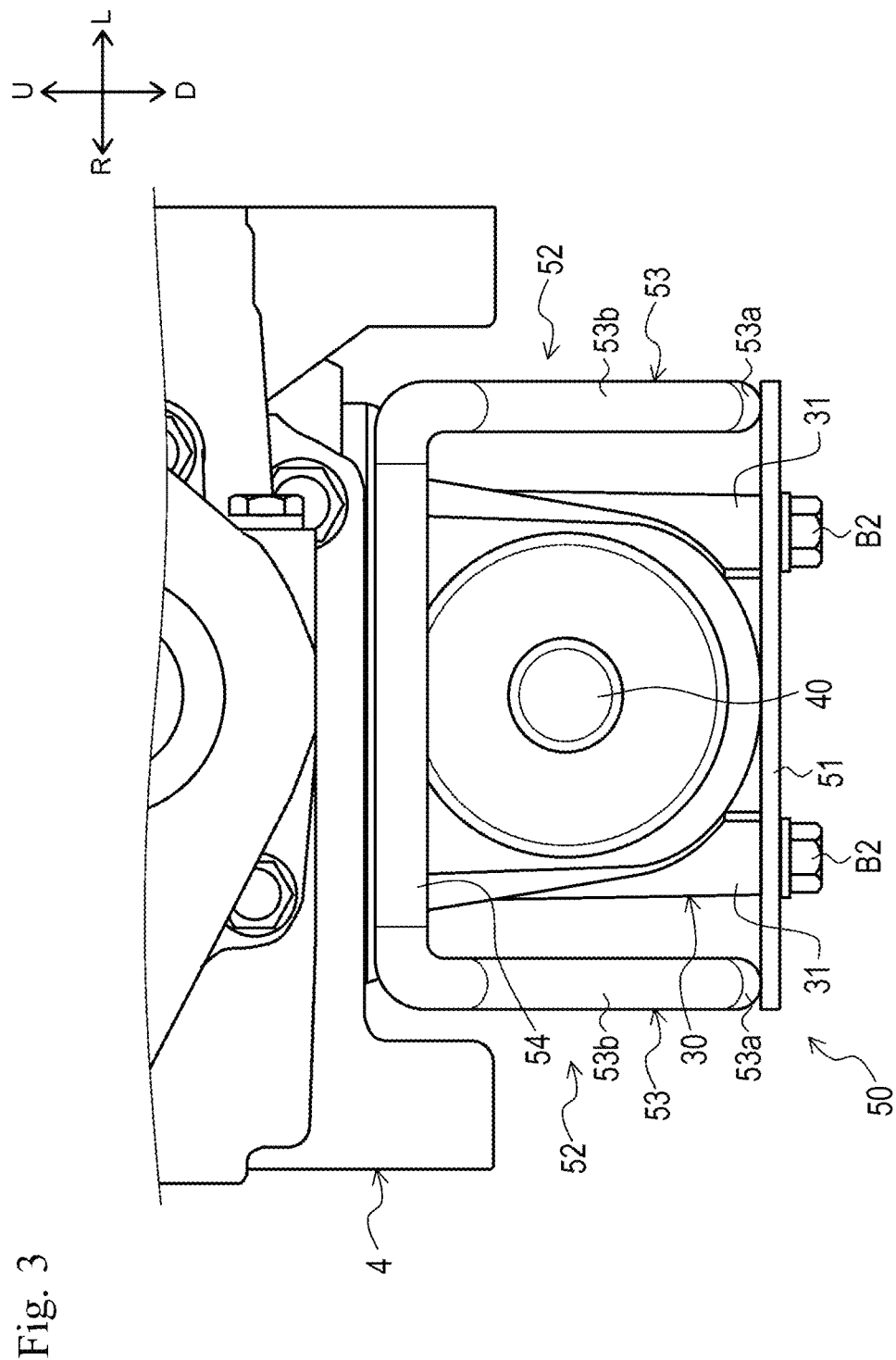
FIG. 3 is a front view showing the transmission case, a PTO case, a mid PTO shaft, and a protective member.
Figure 4:
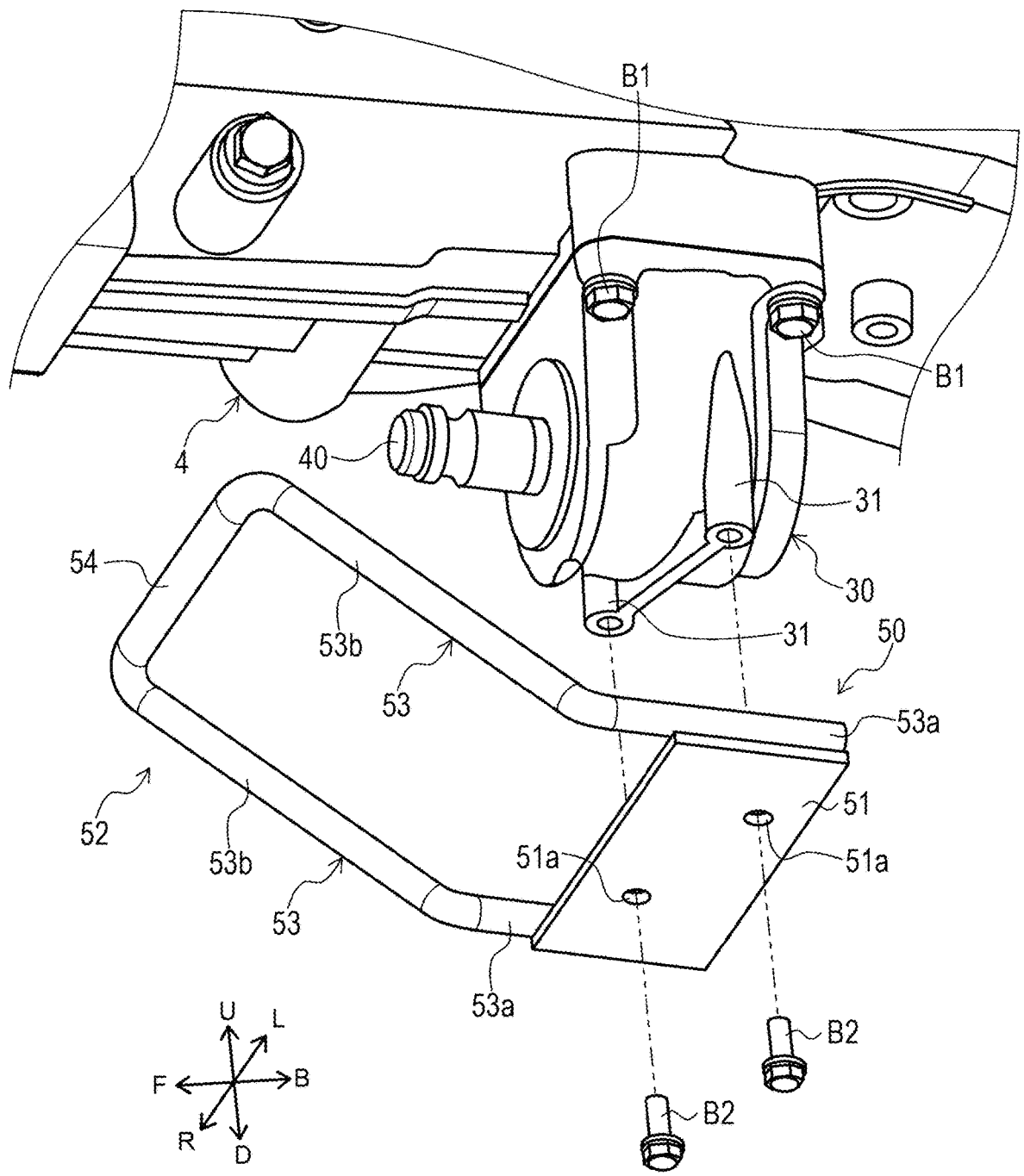
FIG. 4 is an exploded perspective view showing the transmission case, the PTO case, the mid PTO shaft, and the protective member.

The PTO case 30 accommodates a transmission mechanism (not shown) to transmit power from the transmission to the mid PTO shaft 40, which will be described later. The PTO case 30 preferably has a box shape or a substantially box shape with an upper portion and a front portion open. The PTO case 30 is attached to a lower rear portion of the transmission case 4 by bolts B1. The PTO case 30 protrudes downward from the transmission case 4. As shown in FIGS. 2 to 4, the PTO case 30 includes boss portions 31.

The boss portions 31 attach the protective member 50, which will be described later, to the PTO case 30. Each of the boss portions 31 preferably has a cylindrical shape or a substantially cylindrical shape with the axial direction oriented in a vertical direction. The boss portions 31 are provided at a left end portion and a right end portion of the PTO case 30, respectively. The left and right boss portions 31 are structured so that front and rear positions of the left and right boss portions 31 are displaced from each other.

The mid PTO shaft 40 transmits power to a work device mounted on the lower portion of the transmission case 4. The mid PTO shaft 40 is disposed with the axial direction oriented in the front-rear direction. The mid PTO shaft 40 is rotatably supported by a bearing (not shown) accommodated in the PTO case 30 and extends forward from the PTO case 30. The mid PTO shaft 40 is disposed lower than the body frame 2 (see FIG. 1).

The protective member 50 shown in FIGS. 2 to 4 protects the mid PTO shaft 40. The protective member 50 includes an attachment portion 51 and a protective frame 52.

The attachment portion 51 is to attach the protective member 50 to the PTO case 30. The attachment portion 51 preferably has a plate shape or a substantially plate shape with a plate surface oriented in the vertical direction. The attachment portion 51 includes through holes 51a.

The through holes 51a vertically penetrate the attachment portion 51. The through holes 51a are located in a left portion and a right portion of the attachment portion 51, respectively. The through holes 51a are positioned so that front and rear positions of the through holes 51a are displaced from each other.

The protective frame 52 protects the mid PTO shaft 40. The protective frame 52 preferably has a round bar shape or a substantially round bar shape. The protective frame 52 preferably has a U shape or a substantially U shape with an opening facing rearward in a bottom view (see FIG. 5). Further, the protective frame 52 extends upward from a longitudinally middle portion toward a front end portion, and preferably has an inverted U shape or a substantially inverted U shape with the opening facing downward in a front view. The protective frame 52 is formed by appropriately bending one rod-shaped member. The protective frame 52 includes first protective portions 53 and a second protective portion 54.

The first protective portions 53 are located in a left portion and a right portion of the protective frame 52. The first protective portions 53 are symmetrical or substantially symmetrical with respect to left and right central portions of the attachment portion 51. Each of the first protective portions 53 includes a fixed portion 53a and an inclined portion 53b.

The fixed portion 53a is a portion fixed to the attachment portion 51. The fixed portion 53a is disposed with the axial direction oriented in the front-rear direction. The fixed portions 53a are fixed to left and right outer end portions on an upper surface of the attachment portion 51 by welding or the like.

The inclined portion 53b is inclined with respect to the front-rear direction. The inclined portion 53b is continuous with a front end portion of each of the fixed portions 53a. The inclined portion 53b extends from a lower rear to an upper front. An inclination angle of the inclined portion 53b with respect to the front-rear direction is about 30°, for example.

The second protective portion 54 connects a pair of the left and right first protective portions 53. The second protective portion 54 is positioned such that the axial direction oriented in a left-right direction. A left end portion of the second protective portion 54 is connected to a front upper end portion of the left inclined portion 53b. A right end portion of the second protective portion 54 is connected to a front upper end portion of the right inclined portion 53b.

The protective member 50 configured as described above is attached to a lower end portion of the PTO case 30, as shown in FIG. 4, through insertion of bolts B2 into the through holes 51a of the attachment portion 51, and attachment of the bolts B2 to the boss portions 31 of the PTO case 30.

As shown in FIG. 3, the first protective portions 53 are disposed on left and right outer sides of the mid PTO shaft 40. Further, as shown in FIG. 2, the first protective portions 53 extend from the lower side to the front side of the mid PTO shaft 40 in a side view. That is, the first protective portions 53 pass below and in front of the mid PTO shaft 40 from a rear lower side to a front upper side of the mid PTO shaft 40 in a side view. Further, the inclined portion 53b diagonally crosses a space in front of the mid PTO shaft 40 in a side view, the front upper end portion is disposed at a position higher than the mid PTO shaft 40, and the rear lower end portion is disposed below the mid PTO shaft 40. In this way, the inclined portion 53b extends from a position higher to a position lower than the mid PTO shaft 40.

With such a structure, the first protective portions 53 prevent collision with obstacles from the front and the bottom of the mid PTO shaft 40 while the tractor 1 is traveling, and thus prevent the mid PTO shaft 40 from being deformed or damaged. Further, since the first protective portions 53 can evade obstacles by the inclined portion 53b, it is possible to effectively prevent obstacles from colliding with the mid PTO shaft 40.

Here, as described above, various work devices can be mounted on the lower portion of the transmission case 4. A joint to transmit power from the engine 3 to a work device is connected to the mid PTO shaft 40 when the work device is mounted. In the present preferred embodiment, by devising the disposition of the protective member 50, the joint can be mounted on the mid PTO shaft 40 with the protective member 50 attached. Hereinafter, a specific description will be given.

The protective frame 52 is positioned so as to avoid the front of the mid PTO shaft 40 (the direction in which the mid PTO shaft 40 protrudes from the PTO case 30). Specifically, as shown in FIG. 3, the protective frame 52 is disposed so as not to overlap with the mid PTO shaft 40 in a front view. More specifically, the first protective portions 53 are disposed on the left and right outer sides of the mid PTO shaft 40 as described above. Further, the second protective portion 54 is disposed at a position higher than the mid PTO shaft 40. According to such a disposition, it is possible to prevent the protective frame 52 from interfering with the joint, so that the joint can be mounted on the mid PTO shaft 40 with the protective member 50 attached. As a result, the work device can be easily mounted without the trouble of attaching and detaching the protective member 50.

Further, as shown in FIG. 2, the protective frame 52 does not overlap with the mid PTO shaft 40 even in a side view. Specifically, the fixed portions 53a of the first protective portions 53 are below the mid PTO shaft 40. Further, the inclined portion 53b crosses the space in front of the mid PTO shaft 40 in a side view. With such a disposition, the mid PTO shaft 40 can be visually recognized from the left and right outer sides, so that the joint can be easily mounted on the mid PTO shaft 40.

Figure 5:
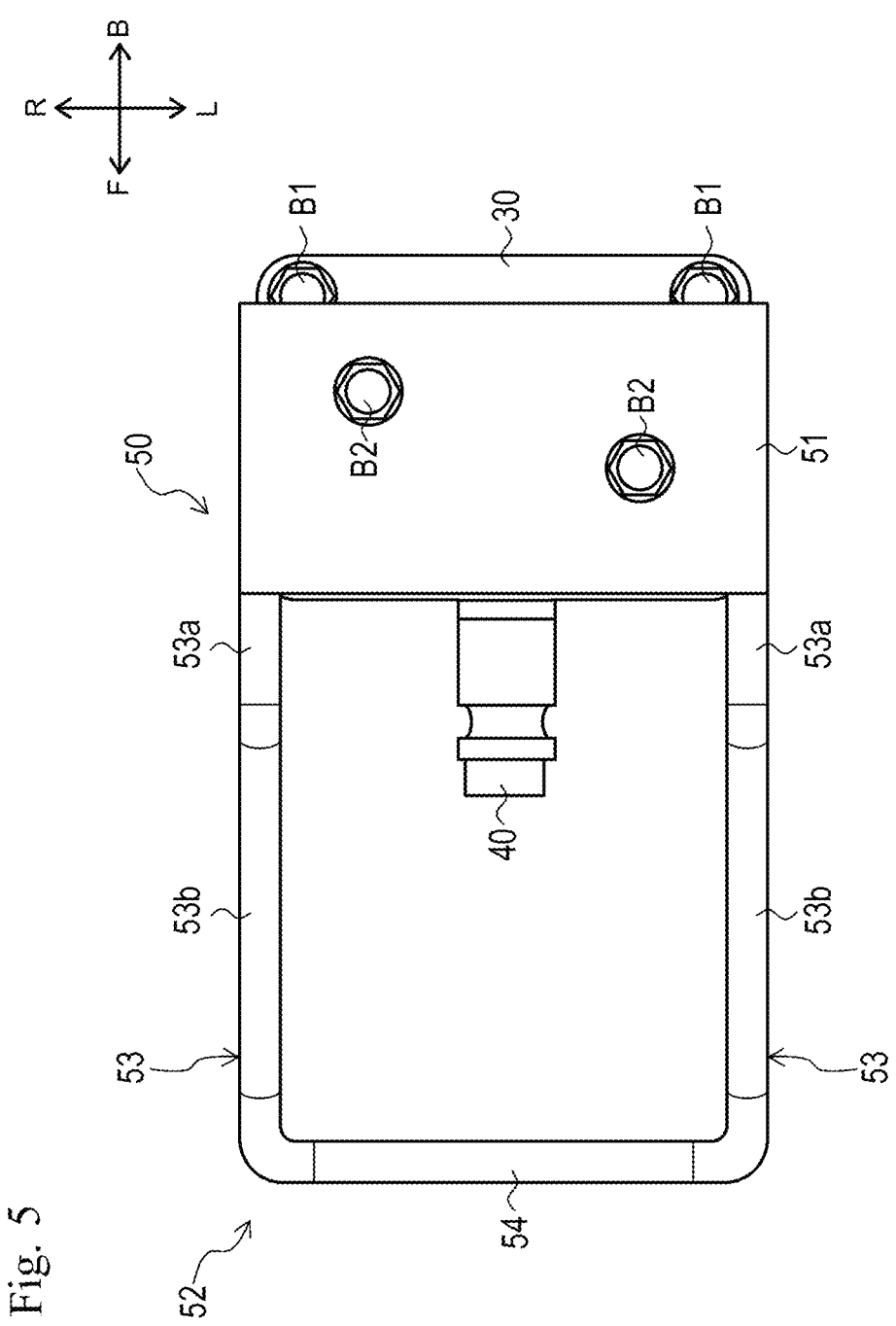
FIG. 5 is a bottom view showing the PTO case, the mid PTO shaft, and the protective member.

Further, as shown in FIG. 5, the protective frame 52 does not overlap with the mid PTO shaft 40 even in a bottom view. Specifically, as described above, the first protective portions 53 are on the left and right outer sides of the mid PTO shaft 40. Further, the second protective portion 54 is in front of the mid PTO shaft 40 in a bottom view. With such a structure, it is possible to reach out from under the mid PTO shaft 40 to perform the work, and the joint can be easily mounted on the mid PTO shaft 40.

Further, the protective frame 52 preferably has a round bar shape or a substantially round bar shape. With such a configuration, it is possible to prevent soil and grass from accumulating on the protective frame 52.

Further, the front end portion of the protective frame 52 is disposed below a lower surface of the transmission case 4. With such a structure, when the protective frame 52 collides with an obstacle and is deformed, the protective frame 52 can be received on the lower surface of the transmission case 4, so that an amount of deformation of the protective frame 52 can be reduced.

As described above, the protective member 50 according to the present preferred embodiment includes the attachment portion 51 attached to the tractor 1 (work vehicle) provided with the mid PTO shaft 40, and the protective frame 52 (protective portion) that is supported by the attachment portion 51 and disposed so as not to overlap with the mid PTO shaft 40 in a front view to protect the mid PTO shaft 40.

With such a configuration, the protective member 50 (protective frame 52) does not get in the way when a work device is mounted on the mid PTO shaft 40. Therefore, the work device can be mounted on the mid PTO shaft 40 with the protective member 50 attached.

Further, the protective frame 52 does not overlap with the mid PTO shaft 40 in a side view.

Further, the protective frame 52 does not overlap with the mid PTO shaft 40 in a bottom view.

With such a configuration, it is possible to easily attach a work device to the mid PTO shaft 40 with the protective member 50 attached.

Further, the protective frame 52 includes the first protective portion 53 that extends from the lower side to the front side of the mid PTO shaft 40 in a side view.

With such a configuration, it is possible to prevent collision with an obstacle from the front and the bottom of the mid PTO shaft 40.

Further, the protective portion includes a pair of the first protective portions 53 that are provided on the left and right sides of the mid PTO shaft 40.

With such a structure, the protective frame 52 can have a simple configuration.

Further, the protective frame 52 further includes the second protective portion 54 that connects the pair of left and right first protective portions 53 to each other.

With such a structure, the strength of the first protective portions 53 and the second protective portion 54 can be improved, and thus the strength of the protective frame 52 can be improved.

Further, the first protective portion 53 includes the inclined portion 53b extending upward toward the front of the inclined portion 53b.

With such a configuration, the inclined portion 53b can evade an obstacle and effectively prevent the mid PTO shaft 40 from colliding with the obstacle.

Further, the inclined portion 53b extends from a position higher to a position lower than the mid PTO shaft 40.

With such a configuration, the mid PTO shaft 40 can be more effectively prevented from colliding with an obstacle.

Further, the attachment portion 51 is attached to the PTO case 30 provided with the mid PTO shaft 40.

With such a configuration, the protective member 50 can be attached near the protection target (mid PTO shaft 40), and the protective member 50 can be miniaturized. Further, according to the above configuration, since it is not necessary to provide an attachment portion to attach the protective member 50 to a side of a vehicle body (for example, the transmission case 4 or the like), the protective member 50 can be easily retrofitted.

Further, as described above, the tractor 1 according to the present preferred embodiment includes the protective member 50.

With such a structure, the protective member 50 (protective frame 52) does not get in the way when a work device is mounted on the mid PTO shaft 40. Therefore, the work device can be mounted on the mid PTO shaft 40 with the protective member 50 attached.

The tractor 1 according to the present preferred embodiment is a preferred embodiment of the work vehicle according to the disclosure.

Further, the protective frame 52 according to the present preferred embodiment is a preferred embodiment of the protective portion according to the disclosure.

Although preferred embodiments of the present disclosure have been described above, the present disclosure is not limited to the above configurations, and various modifications can be made within the scope of the disclosure described in the claims.

For example, a work vehicle according to a preferred embodiment of the present preferred embodiment is the tractor 1, but the type of the work vehicle according to the disclosure is not limited to this. The work vehicle according to preferred embodiments of the present disclosure may be another agricultural vehicle, construction vehicle, industrial vehicle, or the like.

Further, the protective member 50 is attached to the PTO case 30, but the member to which the protective member 50 is attached is not limited to this, and an attachment portion to attach the protective member 50 may be provided to any member and the protective member 50 may be attached to the attachment portion. The protective member 50 may be attached to, for example, the transmission case 4. Further, the protective member 50 may be fixed to each of the PTO case 30 and the transmission case 4. As a result, the strength of the protective member 50 can be improved.

Further, the attachment portion 51 preferably has a plate shape or a substantially plate shape, but the shape of the attachment portion 51 is not limited to this, and may be any shape.

Further, the protective frame 52 does not overlap with the mid PTO shaft 40 in a side view and bottom view, but is not limited to this, and for example, may overlap with the mid PTO shaft 40 in a side view and bottom view.

Further, the protective frame 52 is configured by appropriately bending one rod-shaped member, but the configuration of the protective frame 52 is not limited to this, and may be any configuration. The protective frame 52 may be configured by, for example, appropriately combining plate-shaped members.

Further, the inclination angle of the inclined portion 53b is about 30°, but is not limited to this, and may be any angle.

Further, the protective frame 52 is provided with the inclined portion 53b, but is not limited to this, and may not include the inclined portion 53b.

Further, a pair of the first protective portions 53 are provided on the left and right sides, but are not limited to this, and may include, for example, a single plate-shaped member that covers the lower portion of the mid PTO shaft 40.

Further, the second protective portion 54 connects the end portions of the first protective portions 53, but is not limited to this, and may connect any portions of the first protective portions 53. The second protective portion 54 may connect, for example, middle portions of the first protective portions 53.

Further, the protective frame 52 is provided with the second protective portion 54, but is not limited to this, and may not include the second protective portion 54.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
    a protective member; wherein
    the protective member includes:
        an attachment portion attached to the work vehicle provided with a mid Power Take-Off (PTO) shaft; and
        a protective portion supported by the attachment portion and does not overlap with the mid PTO shaft in a front view to protect the mid PTO shaft; and
    the protective portion includes a first protective portion extending from a lower side to a front side of the mid PTO shaft in a side view.

2. The work vehicle according to claim 1, wherein the protective portion does not overlap with the mid PTO shaft in a side view.

3. The work vehicle according to claim 2, wherein the protective portion does not overlap with the mid PTO shaft in a bottom view.

4. The work vehicle according to claim 1, wherein the protective portion does not overlap with the mid PTO shaft in a bottom view.

5. The work vehicle according to claim 1, wherein the protective portion includes a pair of the first protective portions on left and right sides of the mid PTO shaft.

6. The work vehicle according to claim 5, wherein the protective portion further includes a second protective portion that connects the pair of left and right first protective portions to each other.

7. The work vehicle according to claim 1, wherein the first protective portion includes an inclined portion extending upward toward a front of the inclined portion.

8. The work vehicle according to claim 7, wherein the inclined portion extending from a position higher to a position lower than the mid PTO shaft.

9. The work vehicle according to claim 1, wherein the attachment portion is attached to a PTO case provided with the mid PTO shaft.

* * * * *